United States Defensive Publication [19] (H) [11] T974,003

Millen [43] Sep. 5, 1978

[54] CURE ACCELERATOR FOR POLYSULFIDE POLYMER BASED SEALANTS

[76] Inventor: Edward G. Millen, 246 Cold Soil Rd., Princeton, N.J. 08540

[21] Appl. No.: 890,432

[22] Filed: Mar. 27, 1978

[51] Int. Cl.[2] ..... C08F 28/00

[52] U.S. Cl. ..... 528/374; 260/18 S; 260/30.8 R; 260/31.8 Z

[57] ABSTRACT

Cure rate of liquid polysulfide polymer based sealants may be accelerated by incorporation of tetramethylene sulfone therein. This is particularly of importance in one part sealants cured by $ZnO_2$.

4 Claims, No Sheets Drawing,

8 Pages Specification

The file of this unexamined application may be inspected and copies thereof may be purchased (849 O.G. 1221, Apr. 9, 1968).